United States Patent [19]

Bach

[11] Patent Number: 5,049,334
[45] Date of Patent: Sep. 17, 1991

[54] POST-PRESS HEAT TREATMENT PROCESS FOR IMPROVING THE DIMENSIONAL STABILITY OF A WAFERBOARD PANEL

[75] Inventor: Lars Bach, Edmonton, Canada

[73] Assignee: Alberta Research Council, Edmonton, Canada

[21] Appl. No.: 587,381

[22] Filed: Sep. 25, 1990

[30] Foreign Application Priority Data

Sep. 25, 1989 [CA] Canada ................................ 613071

[51] Int. Cl.⁵ ............................................. B29C 43/52
[52] U.S. Cl. ..................................... 264/122; 264/109
[58] Field of Search ................................. 264/109, 122

[56] References Cited

U.S. PATENT DOCUMENTS 3,969,460  7/1976  Fremont et al. .................... 264/109
4,393,019  7/1983  Geimer ................................. 264/83

FOREIGN PATENT DOCUMENTS 1213707  11/1986  Canada .

Primary Examiner—Mary Lynn Theisen
Attorney, Agent, or Firm—Millen, White & Zelano

[57] ABSTRACT

There is provided a process for improving the thickness swelling properties of a manufactured waferboard panel. The process is based on the discovery that a correlative relationship exists between the relative thickness swelling properties versus the parametric properties of time and temperature. Thus the process involves subjecting the manufactured board to a post-heat treatment at a predetermined temperature for a predetermined time in order to obtain the desired percentage reduction in thickness swelling.

4 Claims, 2 Drawing Sheets

POST-PRESS HEAT TREATMENT PROCESS FOR IMPROVING THE DIMENSIONAL STABILITY OF A WAFERBOARD PANEL

FIELD OF THE INVENTION

The present invention relates to a process for improving the dimensional stability properties of a waferboard panel.

BACKGROUND OF THE INVENTION

Typically, a waferboard panel comprises layers of wood flakes or wafers formed into a composite structure consolidated by the use of a resinous binder. The preparation of wafer board panels is complex, but broadly consists of two principal stages. The first stage comprises the preparation of the wafers and admixing thereof with the binder to form a loose layer or mat The second stage involves subsequent compression and curing of the resin, usually by the application of heat, to form the consolidated panel.

In the manufacture of wafer board it is a common practice to provide a three-layered structure, wherein the better quality flakes are placed on the outer layers of the mat with the poorer quality flakes forming the core of the mat. In practical terms, one would use a faster curing resin i.e. one having a higher temperature of polymerization in the core layer than in the outer layer. Once the core of the mat has been heated sufficiently so as to polymerize the resin, typically at a core temperature of approximately 140° C., the press cycle is ended. A typical press time would be about five minutes.

In commercial operations, the platen temperature is generally set at between about 200°-210° C. to ensure that burning of the wood does not take place. It is known that the burning of wood, does not take place at a fixed temperature, but rather is dependent on the parametric properties of both temperature and time. So optimization of the process involves selection of the appropriate resin and its polymerization characteristics commensurate with the minimum press time and lowest platen temperature.

Particle board, strand board and wafer board (all termed composite board) all exhibit thickness swelling or dimensional instability upon exposure to moisture. Indeed, a measure of the dimensional stability of such composite boards is obtained by determination of such thickness swelling albeit under controlled conditions. Existing Canadian and U.S. standards for waferboard permit a thickness swelling in the range of between 20-25% as the acceptable norm (i.e. when the sample is soaked in cold water for 24 h.). However, one seeks to reduce the thickness swelling of these composite panels to at least that of solid wood which is of the order of 5 to 10%.

It is well known that the thickness swelling properties of waferboard panels may be reduced by increasing the resin content thereof. However this is a costly solution to the problem. It has become accepted in the industry to limit the quantity of resin used to that which is necessary to meet the requisite stability standards.

It is known that if wood is burned or charred, it will not exhibit the same degree of thickness swelling as does unheated raw wood. However, the burning of wood will deleteriously affect bending stiffness and strength.

Prior art processes which involve the injection of superheated steam into the mat are known and disclosed for example in U.S. Pat. No. 4,393,019. The objective of such processes is to polymerize the resin more rapidly thereby reducing the press time from five minutes to two minutes. It was found using these steam injection processes that the thickness swelling properties of the panel were somewhat improved.

Additionally, W. E. Hsu, in Canadian patent 1,213,707, taught that dimensional stability of composite board could be improved by subjecting the formed composite board to a secondary heat treatment. More specifically, the secondary heat treatment proposed heating the board from about 2 to 15 minutes at a temperature ranging from between 230° C. to about 270° C. These temperatures are well in excess of the normal press temperature of 205° C. which is typically used in the manufacture of phenolformaldehyde bonded waferboard.

SUMMARY OF THE INVENTION

In accordance with the present invention, there is provided a process for improving the thickness swelling properties of a manufactured waferboard panel. The process is based on the finding that there exists a correlative relationship between the relative thickness swelling versus the parametric properties of time and temperature. Thus by subjecting the manufactured panel to a post-heat treatment involving a predetermined set of temperature and time conditions, it is possible to reduce the percentage thickness swelling by a predetermined amount. Stated otherwise, it is possible to predict the time required at a given temperature to reduce the thickness swelling to a given value.

The correlative relationship found for reducing the thickness swelling time to half of it's initial value is the following:

$$\text{Log}_t = \left(\frac{6900}{T}\right) - 12.8$$

where
  $t$ = time in minutes for thickness swelling reduction to half of its initial value; and
  T = absolute temperature in °Kelvin More specifically, I have determined that a post manufacture secondary heat treatment involves a 'stabilizing reaction' which imparts these improved thickness swelling properties to the panel. By stabilizing reaction is meant a reaction which is dependent on the parametric properties of both time and temperature, which reaction goes beyond the mere curing of the resin to some as yet in determinate degree. Furthermore, I have discovered that if one permits the post-heat treatment to take place at a substantially constant predetermined low temperature and for a predetermined long period of time or conversely, at a substantially constant predetermined high temperature for a preselected short period of time it is possible to predict the percentage reduction of thickness swelling.

The application of the post press-heat treatment may be made in any several ways. Exemplary methods would include the simple expedient of placing the manufactured panel, whilst still hot, within an insulated box having an array of electrically heated wires therein. Alternatively, a constant temperature oven may be utilized.

As a result of the present process, it is therefore possible to improve the thickness swelling properties of a waferboard panel to a predetermined degree simply and inexpensively.

Broadly stated, the invention is, in a process for manufacturing a waferboard panel which comprises subjecting a mat formed wood of flakes and a heat-curable resin in admixture to a single stage pressing step at a temperature of about 205° C. for four minutes to thereby cure said resin and form the panel, the improvement comprising:

maintaining the panel for a further predetermined time at a preselected, substantially constant, temperature so as to permit the stabilizing reaction to proceed towards completion whereby the thickness swelling of the panel is reduced to a predetermined value.

DESCRIPTION OF THE PREFERRED EMBODIMENT

Figure 1:
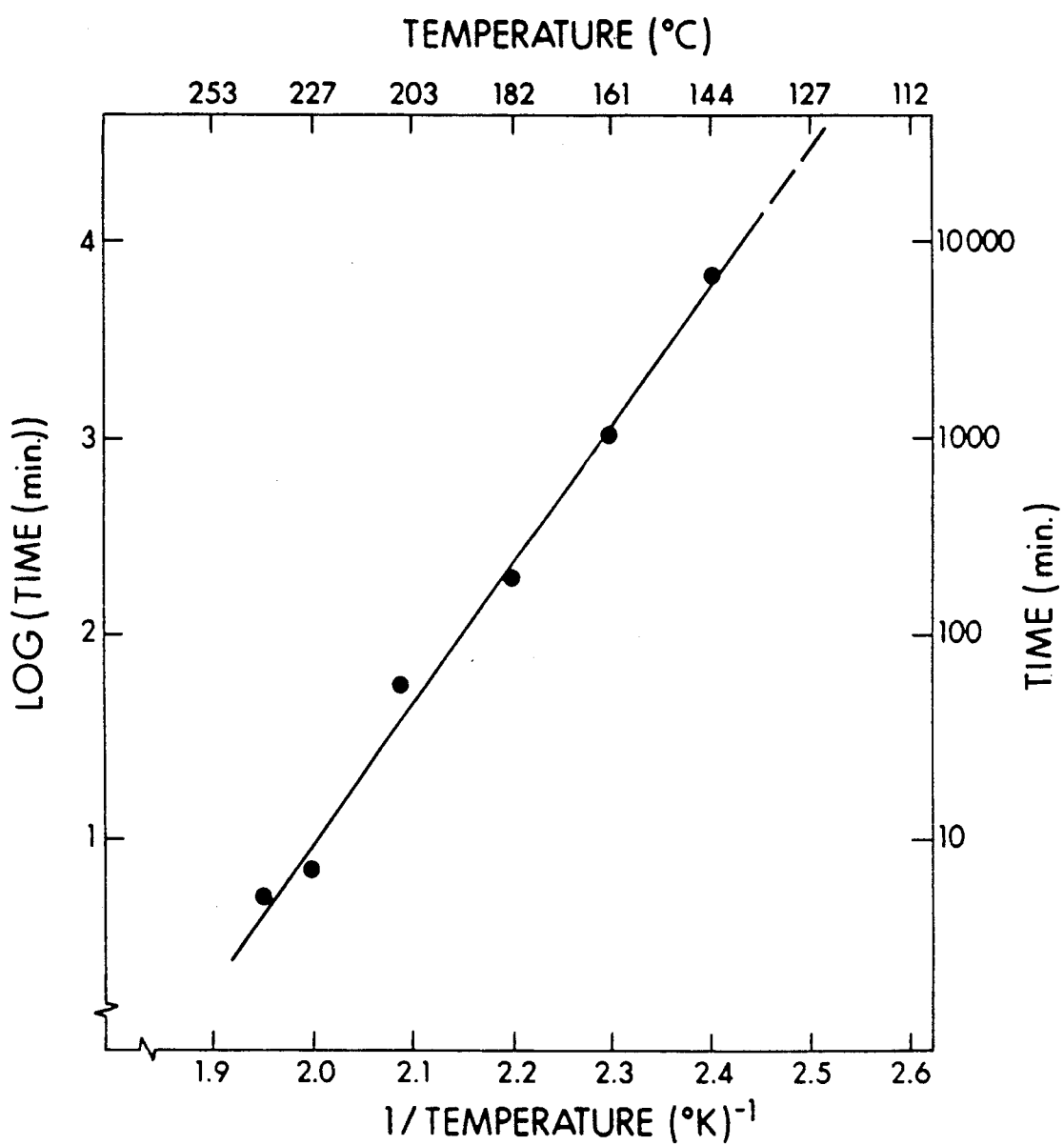
FIG. 1 is a plot of the time of post press heat treatments resulting in the thickness swelling reduction of waferboard to half its initial value versus the temperature. The plotted points were obtained from regression curves based on the data sub-sets for each of the temperatures shown in Table I.
Figure 2:
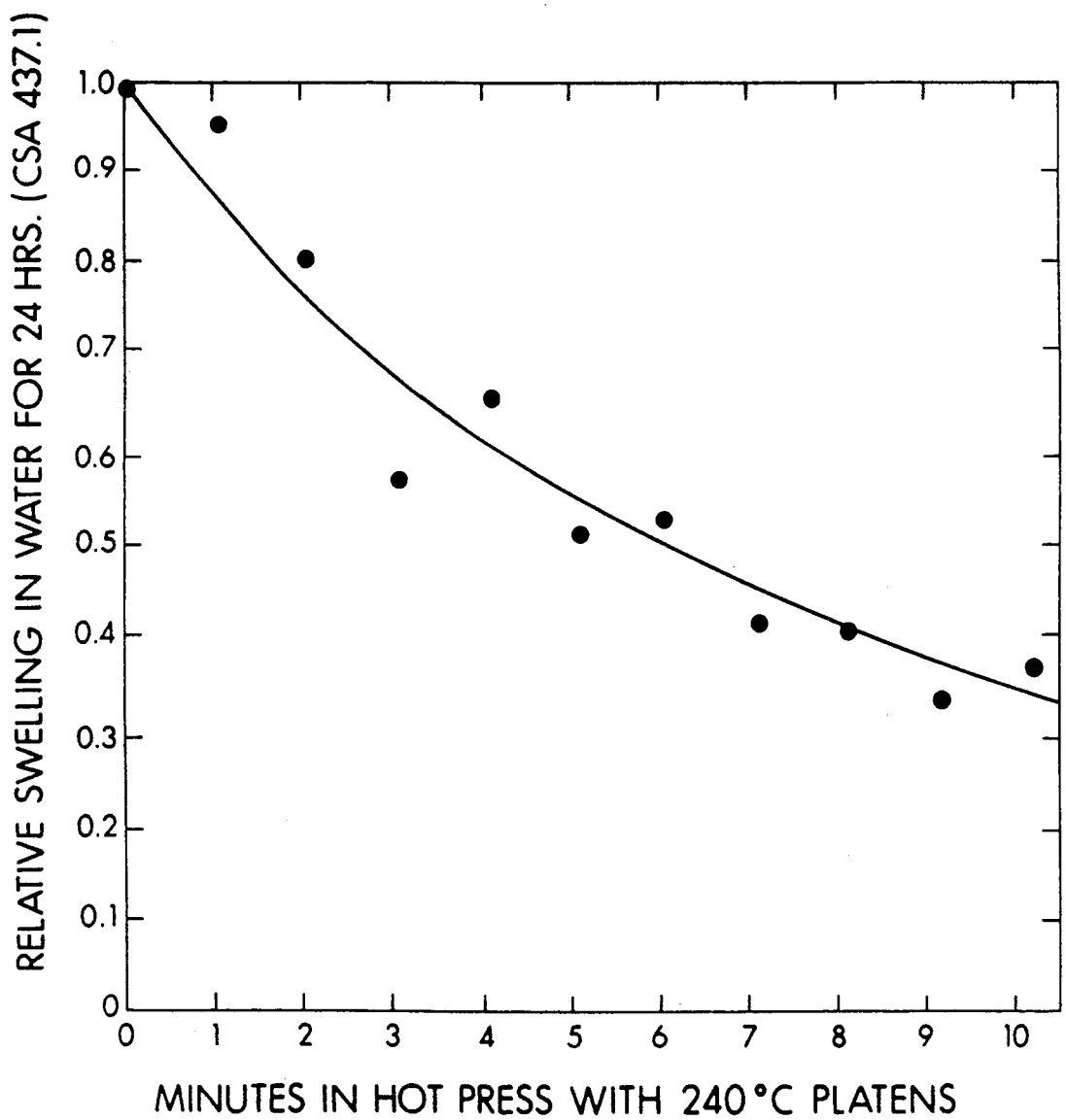
FIG. 2 is a sample plot of the effect of time on the reduction in thickness swelling in a commercially purchased composite board exposed to a constant temperature for various periods to time.

The particular process described herein is applicable to the manufacture of panels of various configurations, exemplary of which would be planar or wave-board panels. The process for preparing composite board having improved thickness swelling properties comprised the following steps.

The furnish may be prepared using various wood species. Aspen logs approximately 8' in length and 6"-4" in diameter were used. The logs were cleaned, debarked, waferized and screened. The strand or wafer length averaged 76 mm (3") and the thickness was about 0.76 mm (0.3"), however other strand or wafer geometries can be used.

The moisture content of the furnish was reduced from the green state to about 5% using commercial dryers. The wafers were screened after drying.

At 5% moisture content, the furnish was blended with 3% by weight of powdered phenol formaldehyde resin and 1% by weight wax in a drum blender. Wax was utilized to improve the moisture resistance of the panel. Resin was utilized as a binder for the wafers.

A suitable resin would be one functional for the selected curing temperature. Exemplary resins would include isocyanate and phenolic resins.

The wafers and wax /resin in admixture were arranged loosely by hand between two flexible stainless steel screens to form the mat. The quantity of wafers and resin used was sufficient to produce a board having the requisite density. The cauls were dusted with talcum powder to prevent bonding of the wafers thereto. Using the cauls, the mat was transferred to the press.

In the press, the mat was subjected to the conventional press temperature of 205° C. for a period of four minutes to thereby form the waferboard panel. The board was further retained in the press for times ranging from 6 minutes to 4 days over temperatures ranging from 240° C. to 144° C. In addition the panels were stored at room temperature for approximately one week following the post press heat treatment. As will be evident to one skilled in the art, with the higher press temperatures it was necessary to retain the panel for a shorter time period. Conversely when the post press heat treatment was carried out at a lower temperature, a longer time period was required to effect the stabilizing reaction.

The following experimental data outlined in Table I given herebelow demonstrates the effect of post heat treatment temperature and time on the thickness swelling properties of waferboard. The wafers used were aspen wood. The binder comprised 2.5% phenol-formaldehyde powdered resin.

TABLE I

| Post Manufacture Heat Exposure Time Minutes | POST MANUFACTURE HEAT TREATMENT IN HOT PRESS | | | | | | | | | | | |
|---|---|---|---|---|---|---|---|---|---|---|---|---|
| | 240° C. | | 227° C. | | 203-207° C. | | 182° C. | | 161° C. | | 144° C. | |
| | Swell % | Rel. SW | Swell % | Rel. SW | Swell % | Rel. SW | Swell % | Rel. SW | Swell % | Rel. SW | Swell % | Rel. SW |
| 0.0 | 14.7 | 1.00 | 15.4 | 1.00 | 15.4 | 1.00 | 15.4 | 1.00 | 15.4 | 1.00 | 15.4 | 1.00 |
| 1.0 | 11.9 | 0.95 | 16 | 1.04 | 15 | 0.97 | 15 | 0.97 | 16 | 1.04 | 15 | 0.97 |
| 3.2 | 8.5 | 0.81 | 16 | 1.04 | 13 | 0.84 | 14 | 0.91 | 16 | 1.04 | 17 | 1.10 |
| 10 | 5.6 | 0.38 | 6 | 0.39 | 10 | 0.65 | 14 | 0.91 | 19 | 1.23 | 17 | 1.10 |
| 32 | — | — | 3 | 0.19 | 8 | 0.52 | 12 | 0.78 | 17 | 1.10 | 15 | 0.97 |
| 100 | — | — | 2 | 0.13 | 8 | 0.52 | 10 | 0.55 | 16 | 1.04 | 14* | 0.81* |
| 340 | — | — | — | — | 3* | 0.19* | N.D. | N.D. | N.D. | N.D. | N.D. | N.D. |
| 1000 | — | — | — | — | — | — | 3* | 0.19* | 8* | 0.52* | N.D. | N.D. |
| 1440 | — | — | — | — | — | — | — | — | — | — | 10* | 0.65* |
| 2880 | — | — | — | — | — | — | — | — | — | — | 10* | 0.65* |
| 4320 | — | — | — | — | — | — | — | — | — | — | 10* | 0.65* |
| 5760 | — | — | — | — | — | — | — | — | — | — | 8* | 0.52* |

*Results marked with a star were obtained by post hot air treatment rather than heat from hot press platens.

Table II shown herebelow gives the results of a normal stack of OSB panels are piled up after manufacture and placed in a warehouse. The temperature range from corner to centre are as follows:

TABLE II

| | Temperature | Time | Resulting Anti-Shrink Efficiency |
|---|---|---|---|
| Corner | 110-19° C. | 1 Hour to 5.8 days | 0% |
| Centre | 125-60° C. | 1 Hour to 5.8 days | 21% |

When a stack of panels are placed in an insulated box to cut down heat loss the results are as follows shown in Table III:

TABLE III

| | Temperature | Time | Resulting Anti-Shrink Efficiency |
|---|---|---|---|
| Corner | 100-47° C. | 1 Hour to 5.8 days | 21% |

TABLE III-continued

|  | Temperature | Time | Resulting Anti-Shrink Efficiency |
|---|---|---|---|
| Centre | 122–100° C. | 1 Hour to 5.8 days | 34% |

Table IV herebelow shows the temperature developments as related to thickness swelling in lift loads of OSB hot stacked and stored for 5.8 days after pressing:

TABLE IV

| | OSB Panels (11.1 mm - 2% PF Resin) in Lifts Sized 780 × 1220 × 2440 mm were stored as follows: | | | | | |
|---|---|---|---|---|---|---|
| | THERMAL BOX Temperature (°C.) | | | NORMAL STORAGE Temperature (°C.) | | |
| Time After | | In Panels | | | In Panels | |
| Stacking | AIR | Min. | Max. | AIR | Min. | Max. |
| 1 hour | 70 | 100 | 122 | 18 | 110 | 125 |
| 10 hours | 90 | 92 | 128 | 12 | 30 | 128 |
| 1 day | 86 | 85 | 130 | 15 | 24 | 130 |
| 2 days | 72 | 68 | 128 | 13 | 17 | 120 |
| 3 days | 65 | 60 | 122 | 15 | 18 | 113 |
| 4 days | 58 | 54 | 115 | 18 | 20 | 88 |
| 5 days | 53 | 49 | 108 | 16 | 20 | 70 |
| 5.8 days | 50 | 47 | 100 | 18 | 19 | 60 |

The embodiments of the invention in which an exclusive property or privilege is claimed are defined as follows:

1. In a process for manufacturing a waferboard panel which comprises subjecting a mat formed wood of flakes and a heat-curable resin in admixture to a single stage pressing step at a temperature of about 250° C. for 4 minutes to thereby cure said resin and form the panel, the improvement comprising:

maintaining the panel for a further predetermined time of from about 4 days to about 10 minutes at a preselected, substantially constant temperature of from about 140° C. to about 230° C. so as to permit the stabilizing reaction to proceed towards completion, whereby the thickness swelling of the panel is reduced to a predetermined value, said time and temperature being selected in accordance with the following equation:

$$\log_t = \frac{6900}{T} - 12.8$$

where t=time in minutes for thickness swelling reduction to half of its initial value; and
T=absolute temperature in °Kelvin.

2. A process according to claim 1, wherein said heat-curable resin is a phenol formaldehyde powdered resin, said resin being present in the mixture of wood flakes and resin in a concentration of about 2–2.5% by weight.

3. A process according to claim 1, wherein said preselected, substantially constant temperature is below 230° C.

4. A process according to claim 2, wherein said preselected, substantially constant temperature is below 230° C.

* * * * *

UNITED STATES PATENT AND TRADEMARK OFFICE
CERTIFICATE OF CORRECTION

PATENT NO. : 5,049,334

DATED : September 17, 1991

INVENTOR(S) : Lars Bach

It is certified that error appears in the above-identified patent and that said Letters Patent is hereby corrected as shown below:

Column 6, line 1, "temperature of about 250°C" should read--"temperature of about 250°C"--.

Signed and Sealed this

Fourth Day of May, 1993

Attest:

MICHAEL K. KIRK

*Attesting Officer*    Acting Commissioner of Patents and Trademarks